United States Patent
Jiang et al.

(10) Patent No.: US 8,116,169 B2
(45) Date of Patent: Feb. 14, 2012

(54) ACTIVE SONAR SYSTEM AND ACTIVE SONAR METHOD USING NOISE REDUCTION TECHNIQUES AND ADVANCED SIGNAL PROCESSING TECHNIQUES

(75) Inventors: Qin Jiang, Woodland Hills, CA (US); Shubha L. Kadambe, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 360 days.

(21) Appl. No.: 12/465,127

(22) Filed: May 13, 2009

(65) Prior Publication Data

US 2011/0228639 A1 Sep. 22, 2011

(51) Int. Cl.
*G01S 15/00* (2006.01)
(52) U.S. Cl. .............................. 367/98; 367/87; 367/88
(58) Field of Classification Search .................. 367/87, 367/95, 97, 98
See application file for complete search history.

(56) References Cited

U.S. PATENT DOCUMENTS

| | | | | |
|---|---|---|---|---|
| 4,420,824 A * | 12/1983 | Weber | | 367/98 |
| 4,549,286 A * | 10/1985 | Langeraar et al. | | 367/97 |
| 4,933,914 A * | 6/1990 | Feintuch et al. | | 367/87 |
| 5,216,640 A * | 6/1993 | Donald et al. | | 367/124 |
| 5,457,662 A * | 10/1995 | Forster | | 367/119 |
| 5,481,505 A * | 1/1996 | Donald et al. | | 367/119 |
| 5,914,912 A * | 6/1999 | Yang | | 367/119 |
| 6,130,641 A * | 10/2000 | Kraeutner et al. | | 342/179 |
| 6,424,596 B1 * | 7/2002 | Donald | | 367/135 |
| 6,525,994 B2 * | 2/2003 | Donald et al. | | 367/130 |
| 7,254,199 B1 * | 8/2007 | Desloge | | 375/350 |
| 2004/0071046 A1 * | 4/2004 | Kervern et al. | | 367/129 |
| 2006/0007784 A1 * | 1/2006 | Lerro et al. | | 367/98 |
| 2006/0133211 A1 * | 6/2006 | Yang | | 367/154 |
| 2010/0128566 A1 | 5/2010 | Jiang | | |
| 2011/0128819 A1 | 6/2011 | Jiang | | |

OTHER PUBLICATIONS

Kadambe, S.; Orr, R.S.; Lyall, M.J.; , "Cross term deleted Wigner representation (CDWR) based signal detection methodologies," Acoustics, Speech, and Signal Processing, 1996. ICASSP-96. Conference Proceedings., 1996 IEEE International Conference on, pp. 2583-2586 vol. 5, May 7-10, 1996.*

Kadambe, S.; Orr, R.; , "Comparative study of the cross-term deleted Wigner and cross biorthogonal representations," Signals, Systems & Computers, 1997. Conference Record of the Thirty-First Asilomar Conference on , vol. 2, No., pp. 1484-1488 vol. 2, Nov. 2-5, 1997.*

Office Action dated May 3, 2011 for U.S. Appl. No. 12/313,741; filed Nov. 24, 2008; 6 pages.

Kadambe et al.; "Instantaneous Frequency Estimation Using the Cross-Term Deleted Wigner Representation (CDWR);" Proceedings of the IEEE-SP International Symposium on Time-Frequency and Time-Scale Analysis, Jun. 18-21, 1996; pp. 289-292.

Kadambe et al.; "Application of Cross-Term Deleted Wigner Representation (CDWR) for Sonar Target Detection/Classification;" Conference Record of the $32^{nd}$ Asilomar Conference on Signals, Systems and Computers, vol. 1; Nov. 1-4, 1998.

U.S. Notice of Allowance dated Aug. 22, 2011; for U.S. Appl. No. 12/313,741; 6 pages.

Response filed Aug. 2, 2011, to Office Action dated May 3, 2011; U.S. Appl. No. 12/313,741; 17 pages.

* cited by examiner

Primary Examiner — Thomas Tarcza
Assistant Examiner — James Hulka
(74) Attorney, Agent, or Firm — Daly, Crowley, Mofford & Durkee, LLP

(57) ABSTRACT

An active sonar system and associated method combine signals from a plurality of receive beams in order to reduce a noise in a reference one of the signals from the plurality of receive beams.

36 Claims, 7 Drawing Sheets

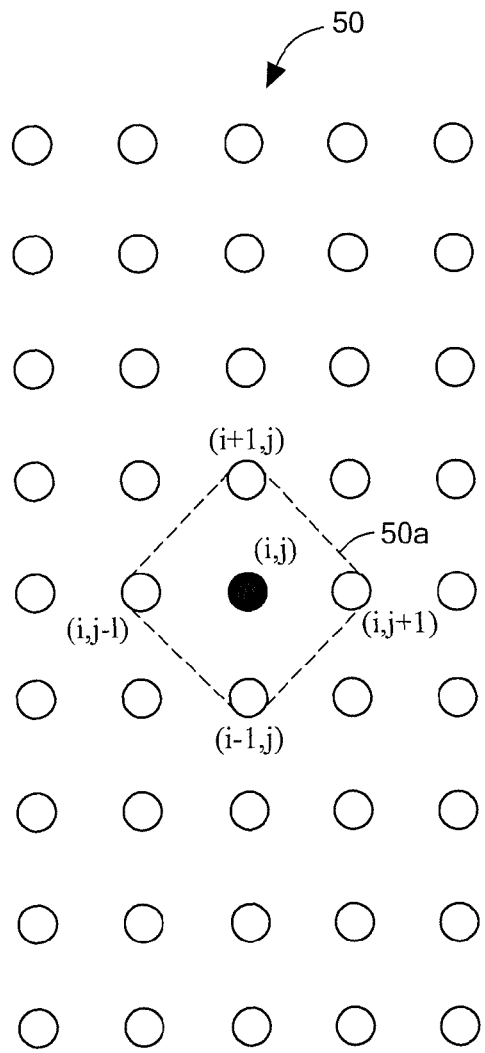
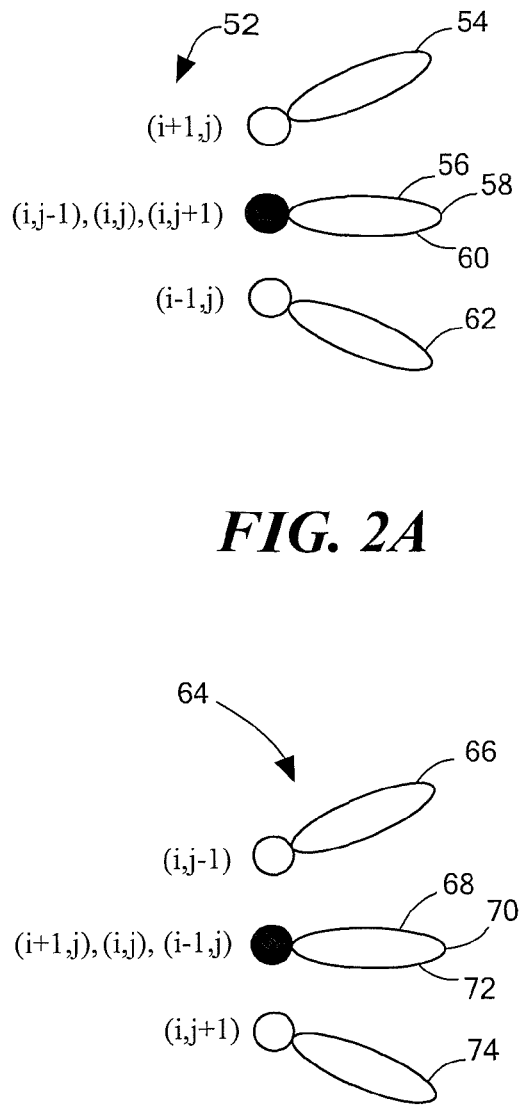
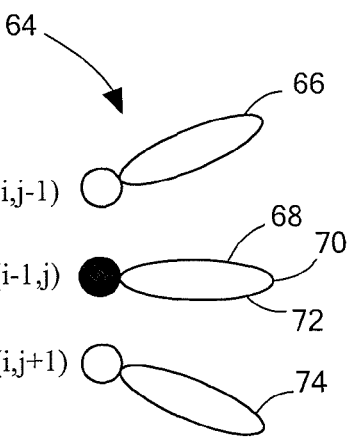
FIG. 2      FIG. 2B

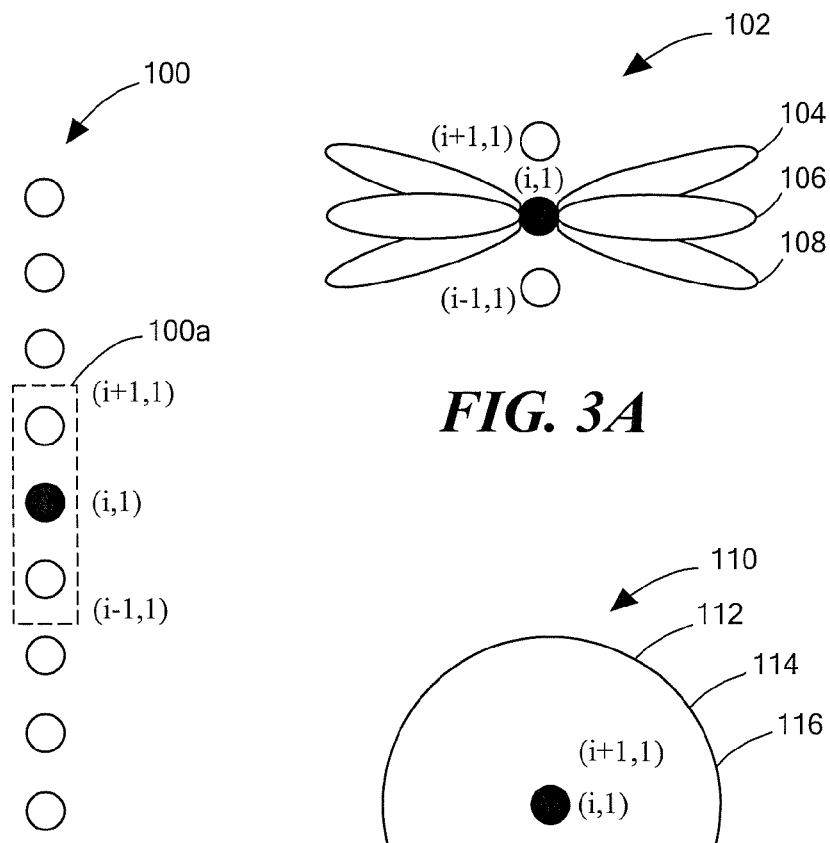
*FIG. 3A*
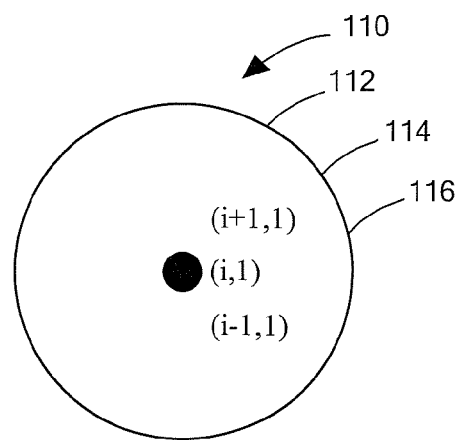
*FIG. 3*
*FIG. 3B*

ACTIVE SONAR SYSTEM AND ACTIVE SONAR METHOD USING NOISE REDUCTION TECHNIQUES AND ADVANCED SIGNAL PROCESSING TECHNIQUES

FIELD OF THE INVENTION

This invention relates generally to active sonar systems and, more particularly, to active sonar systems and methods that provide reduced noise and also advanced processing techniques that result in improved detection of underwater objects, for example, underwater mines.

BACKGROUND OF THE INVENTION

It is known that an underwater vessel (i.e., a submarine) generates sound as it travels through the water. The sound is generated by a variety of sources, including, but not limited to, sound generated by a submarine propulsion system, sound generated by a submarine propeller, and sound generated by a submarine electrical power generator. It is known that submarine designers attempt to reduce these and other sound sources in order to make a submarine difficult to detect by passive acoustic means, therefore remaining as covert as possible.

Some water-born objects do not emit sound, for example, underwater mines. These objects cannot be detected by the sounds they make.

While a conventional passive sonar system merely listens for sounds made by a target of interest, a conventional active sonar system transmits a burst of acoustic energy, called a "ping," which travels at the speed of sound through the water. Some of the acoustic energy reflects from objects in or on the water back toward the active sonar system. These reflections, referred to as "echoes," are received by acoustic sensors at the active sonar system. After a sufficient amount of time has passed, the active sonar system transmits another ping and repeats the above process.

Both active and passive sonar systems must operate in an environment filled with acoustic noises generated by a variety of noise sources, including, but not limited to, ships, surface waves, wind, geologic noises, and biologic noises.

Detection electronics, which forms a part of the active sonar system, performs processing upon the received echoes to improve the likelihood that only echoes from targets of interest are identified and reported to a sonar system operator. However, as described above, the undersea acoustic environment is very noisy, and despite the application of sophisticated detection processing algorithms, the active sonar system may still falsely identify random bursts of noise as targets. These false detections are referred to as "false alarms." If the consequences of reporting a false alarm are severe, then steps can be taken to further reduce a probability of the false alarms, but usually these steps also reduce the probability that a real target of interest will be detected.

A variety of approaches have been used in sonar systems to improve performance in the presence of the noisy ocean environment. For example, both active and passive sonar systems tend to do receive and/or transmit beamforming. Receive beamforming, for both passive and active sonar systems, tends to result in blocking out of directions from which noises may come. Transmit beamforming, for active sonar systems, tends to result in higher power in a transmit beam, and therefore, a stronger echo from an object in or on the water.

Another approach used in sonar systems to improve performance is a matched-filter technique, which will be understood to those of ordinary skill in the art to take a variety of forms in the time or frequency domains.

Another approach used in active sonar systems to improve performance is a "chaining algorithm" that attempts to identify echoes that appear in adjacent ping cycles at ranges consistent with a real target moving at a realistic speed.

It is known that sound can travel through the water in so-called "propagation paths," which can be non-straight paths, particularly when the propagation paths extend over appreciable distances, e.g., miles. The propagation paths can be modeled with propagation models. Some propagation models assume that the sound travels in straight propagation paths. These models are often referred to as isovelocity models, since they presume that sound travels at the same sound speed at all water depths. Other propagation models do not assume that the sound travels in straight propagation paths. These models, which are sometimes referred to as "ray trace" models, can be used to more accurately predict the sound propagation paths and the resulting sound that arrives at a point in the ocean, for example, at a sonar system that receives passive sound from an underwater target. Other propagation models accomplish the equivalent function but are less computationally convenient.

As is also known, sound that travels underwater can often take more than one propagation path. For example, sound can take a "direct propagation path" from a sound source to a sound receiver, which path may curve but not intercept the surface or bottom of the ocean. The sounds can also travel upward from the sound source, on a so-called "surface reflected path," reflecting (or scattering) from the surface of the water and traveling downward to the sound receiver. The sound can also travel downward from the sound source, on a so-called "bottom reflected path," reflecting (or scattering) from the bottom of the water basin and traveling upward to the sound receiver. The sound can also take a variety of other propagation paths, having, for example, both a surface and a bottom reflection (or scattering) or more than one surface and bottom reflection (or scattering).

Through there exist a very large number of sound propagation paths between a sound source and a sound receiver, some of the propagation paths are dominant, i.e., sound received at a sound receiver will have an intensity largely from the dominant sound paths. In particular, because sound tends to lose intensity each time it reflects or scatters from the surface or the bottom, the propagation paths having the strongest sound intensity when received at a sound receiver tend to be the direct path, the surface reflected path, and the bottom reflected path. However, a surface to bottom reflected path and a bottom to surface reflected path can also be considered as well as paths with multiple boundary contacts.

Conventional active sonar systems tend to operate with direct sound paths between the active sonar system and the target of interest. However, conventional active sonar systems also experience (i.e., receive) sound reflecting from the ocean surface and from the ocean bottom. Active sonar systems must distinguish an echo from a target from a reflection from the oceans surface or from the ocean bottom.

It would be desirable to provide new approaches used in active sonar systems to improve performance in the presence of the noisy ocean environment. For example, it would be desirable to provide improved detection and localization of objects in the water.

SUMMARY OF THE INVENTION

The present invention provides an active sonar system and method having advanced noise reduction techniques and advanced processing techniques so as to better detect and localize an object in the water.

In accordance with one aspect of the present invention, a sonar system includes a noise reduction module coupled to receive a plurality of receive signals. The plurality of receive signals is representative of sound propagating in water from a respective plurality of different pointing directions. The plurality of receive signals is associated with a plurality of acoustic receive elements disposed in the water. The noise reduction module is configured to select a reference one of the plurality of receive signals, wherein the reference one of the plurality of receive signals comprises a combination of a noise signal portion and a target echo signal portion. The noise reduction processor is further configured to combine the plurality of receive signals resulting in a reduction of the noise signal portion to generate a corresponding noise reduced signal associated with the reference one of the plurality of receive signals.

In accordance with another aspect of the present invention, a method of sonar processing includes receiving a plurality of receive signals. The plurality of receive signals is representative of sound propagating in water from a respective plurality of different pointing directions. The plurality of receive signals is associated with a plurality of acoustic receive elements disposed in the water. The method also includes selecting a reference one of the plurality of receive signals, wherein the reference one of the plurality of receive signals comprises a combination of a noise signal portion and a target echo signal portion. The method also includes combining the plurality of receive signals resulting in a reduction of the noise signal portion to generate a corresponding noise reduced signal associated with the reference one of the plurality of receive signals.

In accordance with another aspect of the present invention, a computer-readable storage medium having computer readable code thereon for providing sonar processing includes instructions for receiving a plurality of receive signals with. The plurality of receive signals is representative of sound propagating in water from a respective plurality of different pointing directions. The plurality of receive signals is associated with a plurality of acoustic receive elements disposed in the water. The computer-readable storage medium also includes instructions for selecting a reference one of the plurality of receive signals, wherein the reference one of the plurality of receive signals comprises a combination of a noise signal portion and a target echo signal portion. The computer-readable storage medium also includes instructions for combining the plurality of receive signals resulting in a reduction of the noise signal portion to generate a corresponding noise reduced signal associated with the reference one of the plurality of receive signals.

BRIEF DESCRIPTION OF THE DRAWINGS

The foregoing features of the invention, as well as the invention itself may be more fully understood from the following detailed description of the drawings, in which:

FIG. 2 is a block diagram of an exemplary receive array as a planar array to which the signal processor of FIG. 1 can be coupled;

FIG. 2A is a graph showing an exemplary vertical beampattern associated with the receive array of FIG. 2;

FIG. 2B is a graph showing an exemplary horizontal beampattern associated with the receive array of FIG. 2;

FIG. 3 is a graph showing another exemplary receive array as a line array to which the signal processor of FIG. 1 can be coupled;

FIG. 3A is a graph showing an exemplary vertical beampattern associated with the receive array of FIG. 3;

FIG. 3B is a graph showing an exemplary horizontal beampattern associated with the receive array of FIG. 3;

DETAILED DESCRIPTION OF THE INVENTION

Figure 1:
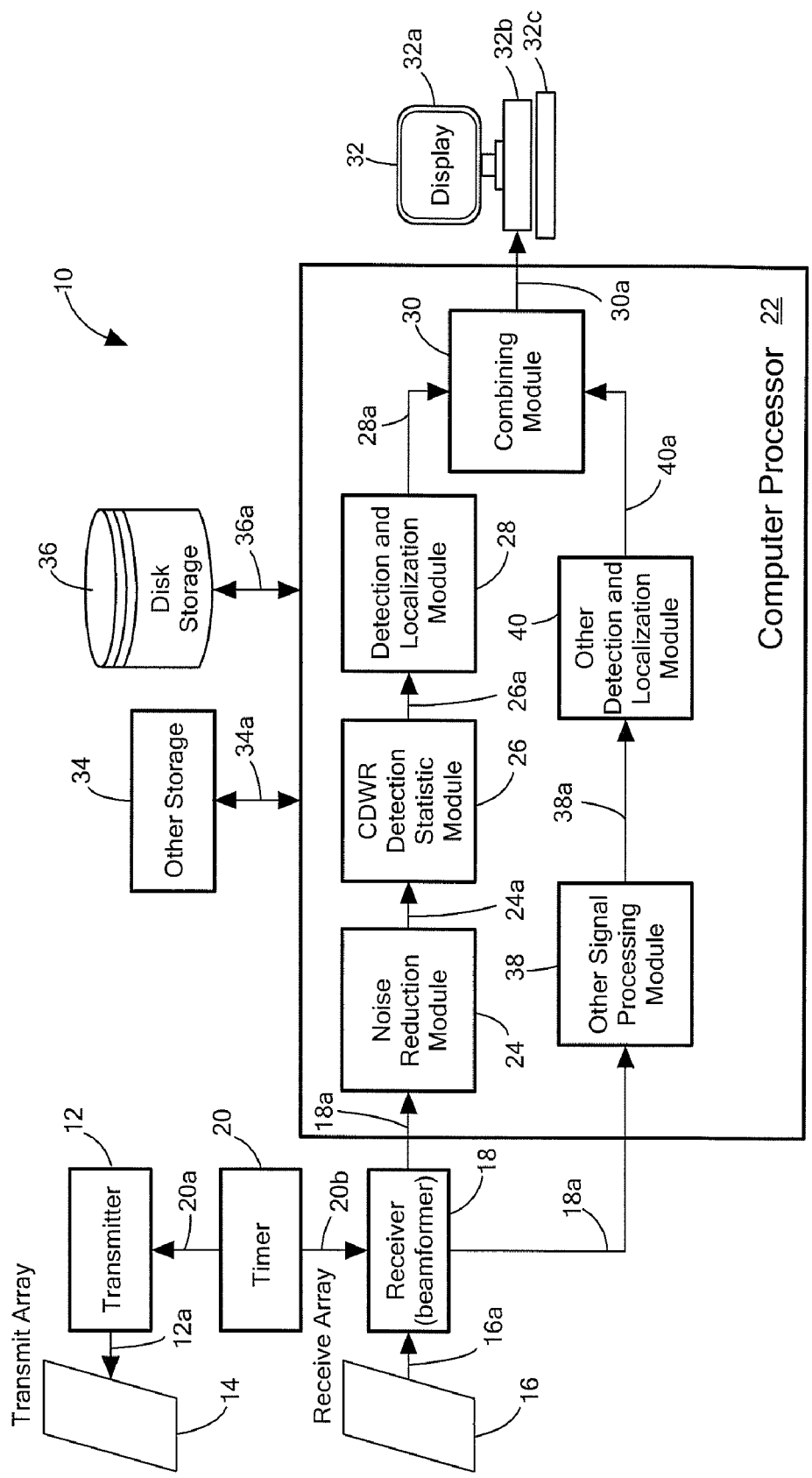
FIG. 1 is a block diagram showing a sonar system in accordance with the present invention comprising a computer processor having a noise reduction module, a cross-term deleted Wigner representation (CDWR) detection statistic module, and a detection and localization module, wherein the computer processor is configured to couple to a receive array.

Referring to FIG. 1, an exemplary sonar system 10 includes a transmitter 12 configured to generate one or more transmit signals 12a. A transmit array 14 disposed in the water, for example, in the ocean, is coupled to receive the one or more transmit signals 12a and configured to project sound into the water. The sound projected into the water can be a single frequency pulse, a multi-frequency pulse, a frequency modulated continuous wave (FMCW) sweep, a spread spectrum pulse (for example, a pseudo-random noise pulse), or any combination thereof.

In some arrangements, sound transmitted by the transmit array 14 is substantially omnidirectional in horizontal and vertical planes. In other arrangements, the sound transmitted by the transmit array 14 is somewhat directional in at least one of the horizontal or vertical planes, for example, limited to approximately one hundred eighty degrees. In still other arrangements, the sound transmitted by the transmit array 14 is contained in one or more directional beams, for example, beams having beamwidths of less than forty-five degrees in at least one of the horizontal or vertical planes.

The sonar system 10 also includes a receive array 16 disposed in the water and configured to receive sound propagating in the water. As will become apparent from discussion below in conjunction with FIGS. 2-3B, the receive array can be in one of a variety of forms and can be used to generate a plurality of directional receive beampatterns, each pointing to receive sound from a different respective direction. The plurality of directional receive beampatterns provides a corresponding plurality of receive signals.

As will become apparent from discussion below, in some embodiments, the receive array 16 can have a plurality of receive elements, each of which can have a respective directional beampattern to provide the plurality of directional receive beampatterns and the corresponding plurality of receive signals. However, in other embodiments, each one of the plurality of receive element of the receive array 16 can have a substantially non-directional (i.e., omnidirectional) or widely directional beampattern, in which case, electronic beamforming techniques can be used to generate the plurality of directional receive beampatterns and the corresponding plurality of receive signals.

The receive array 16 itself is configured to generate a plurality of signals 16a. A receiver 18 is coupled to receive the plurality of signals and configured to generate a plurality of receive signals 18a. As described above, in some embodiments, the receiver 18 can include a beamformer configured to generate the plurality of receive signals 18a. However, in other embodiments, the receiver 18 does not include a beamformer and the plurality of receive signals 18a is representative of the plurality of signals 16a, but in amplified form.

The sonar system 10 can include a timer 20 coupled to the transmitter 12 and to the receiver 18. The timer 20 is configured to provide timing signals 20a, 20b to result in the transmit signals 12a and the corresponding plurality of receive signals 18a in an active sonar timing pattern.

It should be understood that blocks identified as modules within a computer processor 22 can be hardware module, software modules, or any combination of hardware and software modules.

The computer processor 22 can include a noise reduction module 24 coupled to receive the plurality of receive signals 18a. The plurality of receive signals 18a are representative of sound propagating in water from a respective plurality of different pointing directions, which are described more fully below in conjunction with FIGS. 2-3B. The plurality of receive signals 18a is associated with a plurality of acoustic receive elements disposed in the water, which elements are within the receive array 16. The noise reduction module 24 is configured to select a reference one of the plurality of receive signals 18a. The reference one of the plurality of receive signals comprises a combination of a noise signal portion and a target echo signal portion associated with sound transmitted into the water by the transmit array 14 and returned as an echo from an object in the water. The noise reduction processor 24 is further configured to combine the plurality of receive signals resulting in a reduction of the noise signal portion to generate a corresponding noise reduced signal 24a associated with the reference one of the plurality of receive signals 18a.

From discussion below in conjunction with FIG. 6, it will become apparent that, in some embodiments, the noise reduced signal 24a can include one or more noise reduced signals 24a corresponding to one or more respective selected ones of the plurality of receive signals 18a. Thus the various function described below in conjunction with FIGS. 1-4 can be applied either in series or in parallel to the more than one noise reduced signal 24a. However, for clarity, only one noise reduced signal 24a and operations thereupon are discussed herein, with the exception of FIG. 6.

A cross-term deleted Wigner representation (CDWR) detection statistic module 26 can be coupled to receive the noise reduced signal 24a. The CDWR function is described more fully below. Let it suffice here to say that the CDWR detection statistic module 26 can be configured to apply a CDWR function to the noise reduced signal 24a. The CDWR function results in a representation of the noise reduced signal 24a in frequency and in time.

The CDWR detection statistic module 26 can also be configured to generate one or more detection statistic values 26a by computing products of cross-term deleted Wigner representations. The products are described more fully below. Let it suffice here to say that the CDWR detection statistic module 26 can apply an auto-CDWR function to the noise reduced signal, can apply a cross-CDWR function to a combination of the noise reduced signal 24a with the transmit signal 12a, and can cross-correlate the auto-CDWR function and the cross-CDWR function. This results in the one or more detection statistic values 26a.

In some embodiments, the computer processor 22 can also include a detection and localization module 28 coupled to receive the one or more detection statistic values 26a. The detection and localization module 28 can be configured to determine a detection threshold, configured to compare the one or more detection statistic values to the detection threshold to determine a detection of an object in the water, e.g., a target, e.g., a mine, and configured to generate a target detection and localization signal 28a indicative of a direction (azimuth and elevation) of a target in the water, e.g., a mine, and a distance to the target.

Further details and operation of the noise reduction module 24 are described below in conjunction with FIGS. 4 and 5. Further details and operation of the CDWR detection statistic module 26 and the detection and localization module 28 are described below in conjunction with FIG. 6.

In some embodiments, the computer processor 22 can also include an other signal processing module 38 coupled to receive the plurality of receive signals 18a and configured to generate another one or more detection statistic values 38a. The computer processor 22 can also include an other detection and localization module 40 coupled to receive the another one or more detection statistic values 38a and configured to generate another signal 40a indicative of the direction (azimuth and elevation) of the target in the water, e.g., a mine, and a distance to the target. The other signal processing module 38 can include one of a variety of conventional techniques, for example, a matched filter, and the other detection and localization module 40 can include a variety of conventional techniques, for example, noise-based thresholding. The other detection and localization module 40 can be configured to generate another target detection and localization signal 40a.

The computer processor 22 can also include a combining module 30 coupled to receive the target detection and localization signals 28a, 40a and configured to generate a combined detection and localization signal 30a. A computer 32 with a computer display 32a can be coupled to receive the combined detection and localization signal 30a and configured to display combined detection and localization signal information on the display 32a. In some embodiments, the computer 32 can also include another computer processor 32b and a keyboard 32c.

In some embodiments the computer processor 22 does not include the other signal processing module 38, the other detection and localization module 40, or the combining module 30, in which case the computer 32 is coupled to receive the target detection and localization signal 28a.

In some embodiments, the computer processor 22 can be coupled to other storage apparatus, for example, a disk storage 36 and other storage 34, for example, random access memory.

It will be understood that the modules 24, 26, 28, 38, 40, 30 within the computer processor 22 can be software modules stored within associated program memory, which can be random access memory within the computer processor 22, and the random access memory can be loaded with instructions that originate from the disk storage 36.

Referring now to FIG. 2, in some embodiments, an array 50 having a plurality of acoustic elements (shown as small circles) can be the same as or similar to the receive array 16 of FIG. 1. The array 50 is shown to be a planar array but can be can be a planar array or a volumetric array, for example, an array of elements conformal to a non-planar hull of a waterborne vessel.

The elements of the array 50 are identified by particular nomenclature, wherein the letter "i" is representative of a row of the array, and the letter "j" is representative of a column of the array. Thus, an element labeled as (i,j) is at the ith row and the jth column.

The term "subarray" is used herein in two different but similar ways. In a first context, wherein physical array elements provide beampatterns without additional beamforming, the term subarray is used to indicate a selected plurality of elements of the array 50 (equivalent to beams) that are used to provide some of or all of the above-described plurality of receive signals, e.g., the plurality of receive signals 18a of FIG. 1. An exemplary subarray 50a within the receive array 50 includes five array elements, namely elements (i, j−1), (i,j), (i, j+1), (i+1,j), and (i−1,j). The darker element designated as (i,j) is representative of the above-described reference element selected from among the selected plurality of elements (i, j−1), (i,j), (i, j+1), (i+1,j), and (i−1,j).

In a second context, wherein physical array elements are used with beamforming as may be provided by the beamformer 18 of FIG. 1, to provide beams, the term subarray is used to indicate a selected plurality of beams associated with the array 50 that are used to provide some of or all of the above-described plurality of receive signals, e.g., the plurality of receive signals 18a of FIG. 1. Thus, in both contexts, the term subarray is used to describe a set of beams that may or may not map directly to an equal number of array elements. However, in examples set forth below, unless otherwise specified, the array elements are assumed to be associated with corresponding directional beams, and therefore, a subarray is assumed to be comprised of directional array elements.

As described above, it should be understood that the reference element (i,j) and the selected subarray 50a are processed by the noise reduction module 24 of FIG. 1 to provide a noise reduced signal, e.g., the noise reduced signal 24a of FIG. 1, which is representative of a noise reduced version of a receive signal associated with the single reference element (i,j) (or a receive beam associated with the reference element (i,j). Other subarrays and other reference elements from within the receive array 50 can be processed in series or in parallel with the reference element (i,j) and the selected subarray 50a in order to provide noise reduced signals representative of noise reduced versions of receive signals associated with the other reference elements (or other beams).

While the exemplary subarray 50a is shown having five array elements, a subarray can have any number of array elements greater than one array element.

Referring now to FIG. 2A, in which like elements of FIG. 2 are shown having like reference designations, the elements (i+1,j), (i,j−1), (i,j), (i,j+1) and (i−1,j) of the subarray 50a provide vertical beampatterns 54, 56, 58, 60, 62 respectively, each directed to receive sound in the water from a different pointing direction. Vertical beampatterns 56, 58, 60 overlay each other in this view.

Referring now to FIG. 2B, in which like elements of FIG. 2 are shown having like reference designations, the elements (i, j−1), (i+1,j), (i,j), (i−1,j), and (i,j+1) of the subarray 50a provide horizontal beampatterns 66, 68, 70, 72, 74, respectively, each directed to receive sound in the water from a different pointing direction. Horizontal beampatterns 68, 70, 72 overlay each other in this view.

While both vertical beampatterns 52 and horizontal beampatterns 64 are shown to have different pointing directions, in some embodiments, only the vertical beampatterns 52 or only the horizontal beampatterns 64 have different pointing directions.

It should be recognized that the beampatterns 52, 64 are shown to have narrow beam angles for clarity, however, in some embodiments, either the vertical beampatterns 52 or the horizontal beampatterns 64, or both, have wide beam angles, for example, forty-five degrees, and the wide beam angles can overlap each other.

It should be understood that beampatterns 52, 64 of FIGS. 2A and 2B are indicative of array elements that have directional beampatterns without electronic beamforming and without spatial beamforming between elements of the array 50. In these embodiments, the beampatterns 52, 64 each have phase centers at respective elements of the array 50.

Figure 2C:
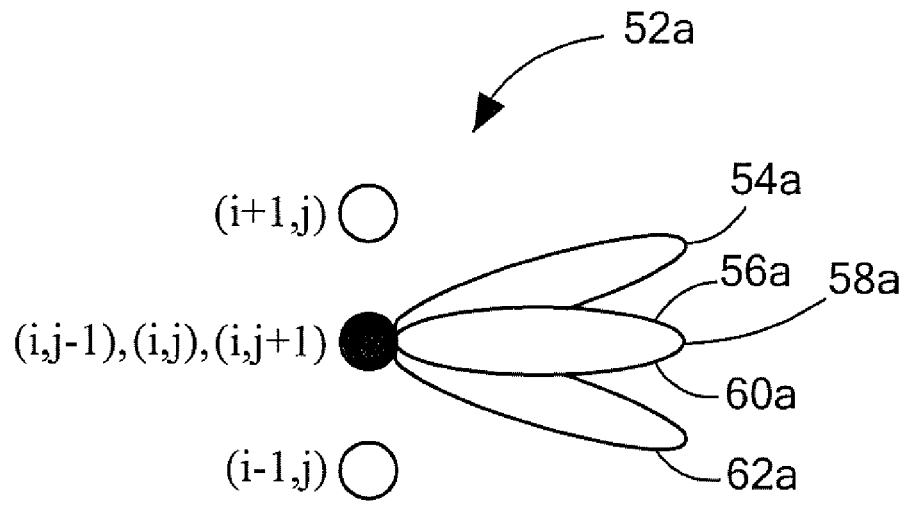
FIG. 2C is a graph showing another exemplary vertical beampattern associated with the receive array of FIG. 2.

Referring now to FIG. 2C, in which like elements of FIG. 2 are shown having like reference designations, the elements (i+1,j), (i, j−1), (i,j), (i, j+1), and (i−1,j) of the subarray 50a provide vertical beampatterns 54a, 56a, 58a, 60a, 62a, respectively, each directed to receive sound in the water from a different pointing direction. Vertical beampatterns 56a, 58a, 60a overlay each other in this view.

Figure 2D:
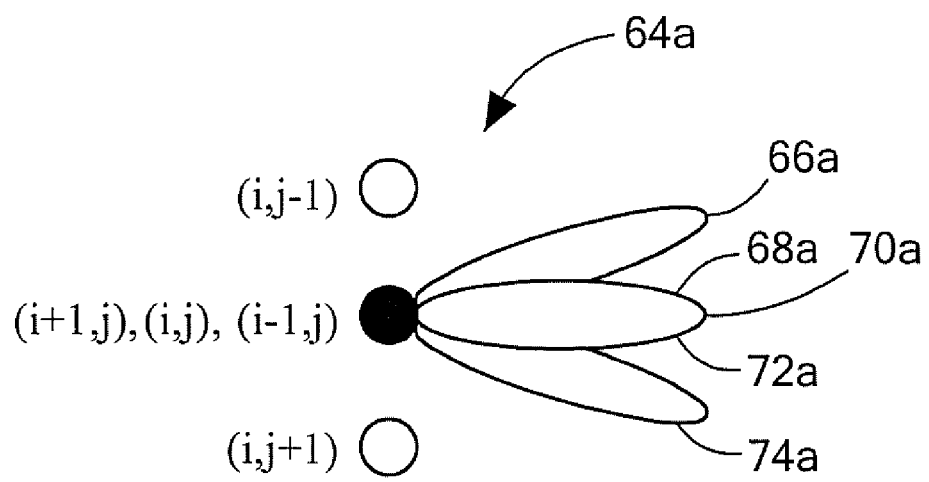
FIG. 2D is a graph showing another exemplary horizontal beampattern associated with the receive array of FIG. 2.

Referring now to FIG. 2D, in which like elements of FIG. 2 are shown having like reference designations, the elements (i, j−1), (i+1,j), (i,j), (i−1,j), and (i,j+1) of the subarray 50a provide horizontal beampatterns 66a, 68a, 70a, 72a, 74a, respectively, each directed to receive sound in the water from a different pointing direction. Horizontal beampatterns 68a, 70a, 72a overlay each other in this view.

While both vertical beampatterns 52a and horizontal beampatterns 64a are shown to have different pointing directions, in some embodiments, only the vertical beampatterns 52a or only the horizontal beampatterns 64a have different pointing directions.

It should be recognized that the beampatterns 52a, 64a are shown to have narrow beam angles for clarity, however, in some embodiments, either the vertical beampatterns 52a or the horizontal beampatterns 64a, or both, have wide beam angles, for example, forty-five degrees, and the wide beam angles can overlap each other.

It should be understood that beampatterns 52a, 64a of FIGS. 2C and 2D are indicative of array elements that have non-directional (i.e., omnidirectional) beampatterns, and the directional beampatterns 52a, 64a are provided by electronic beamforming (e.g., 18 of FIG. 1) for combining elements of the array 50 (FIG. 2). In these embodiments, the beampatterns 52a, 64a each have phase centers at the selected reference element (i,j) of the array 50.

Referring now to FIG. 3, in some embodiments, an array 100 having a plurality of acoustic elements (shown as small circles) can be the same as or similar to the receive array 16 of FIG. 1. The array 100 is shown to be a straight line array but can be can be a straight line array or a curved line array, for example, a line array of elements conformal to a non-planar hull of a water-borne vessel.

The elements of the array 100 are identified by particular nomenclature, wherein the letter "i" is representative of an element of the line array, and the letter "j," here a "1," is representative of a single column of the line array. Thus, an element labeled as (i,l) is at the ith element and the line array identified as "1."

The term "subarray" is used herein to indicate a selected plurality of elements of the array 100 that are used to provide some of or all of the above-described plurality of receive signals, e.g., the plurality of receive signals 18a of FIG. 1. An exemplary subarray 100a within the receive array 100 includes three array elements, namely elements (i+1, 1), (i,1), (i−1, 1). The darker element designated as (i,1) is representative of the above-described reference element selected from among the selected plurality of elements (i+1, 1), (i,1), (i−1, 1).

As described above, it should be understood that the reference element (i,l) and the selected subarray 100a are processed by the noise reduction module 24 of FIG. 1 to provide a noise reduced signal, e.g., the noise reduced signal 24a of FIG. 1, which is representative of a noise reduced version of a receive signal associated with the single reference element (i,1) (or a receive beam associated with the reference element (i,j). Other subarrays and other reference elements from within the receive array 100 can be processed in series or in parallel with the reference element (i,1) and the selected subarray 100a in order to provide noise reduced signals representative of noise reduced versions of receive signals associated with the other reference elements (or other beams).

While the exemplary subarray 100a is shown having three array elements, a subarray can have any number of array elements greater than one array element.

Referring now to FIG. 3A, in which like elements of FIG. 3 are shown having like reference designations, the elements (i+1,1), (i,1), and (i−1, 1) of the subarray 100a provide vertical beampatterns 102, 104, 106, respectively, each directed to receive sound in the water from a different pointing direction.

Referring now to FIG. 3B, in which like elements of FIG. 3 are shown having like reference designations, the elements i+1,1), (i,1), and (i−1, 1) of the subarray 100a provide horizontal beampatterns 112, 114, 116, respectively, each of which can be substantially omnidirectional. Horizontal beampatterns 112, 114, 116 overlay each other in this view.

It should be recognized that the vertical beampatterns 104, 106, 108 are shown to have narrow beam angles for clarity, however, in some embodiments, the vertical beampatterns 104, 106, 108 have wide beam angles, for example, forty-five degrees, and the wide beam angles can overlap each other.

It should be understood that beampatterns 102, 110 of FIGS. 3A and 3B are indicative of array elements that have non-directional (i.e., omnidirectional) beampatterns, and the directional beampatterns 102 are provided by electronic beamforming (e.g., 18 of FIG. 1) for combining elements of the array 100 (FIG. 3). In these embodiments, the beampatterns 102, 110 each have phase centers at the selected reference element (i,j) of the array 100. In other embodiments, it will be understood, that like the beams of FIGS. 2A and 2B, the elements of the array 100 can have directional patterns and beampatterns similar to the beampatterns 102, 110 can be formed without beamforming, in which case the phase centers of the beampatterns will be at associated ones of the array elements.

Figure 4:
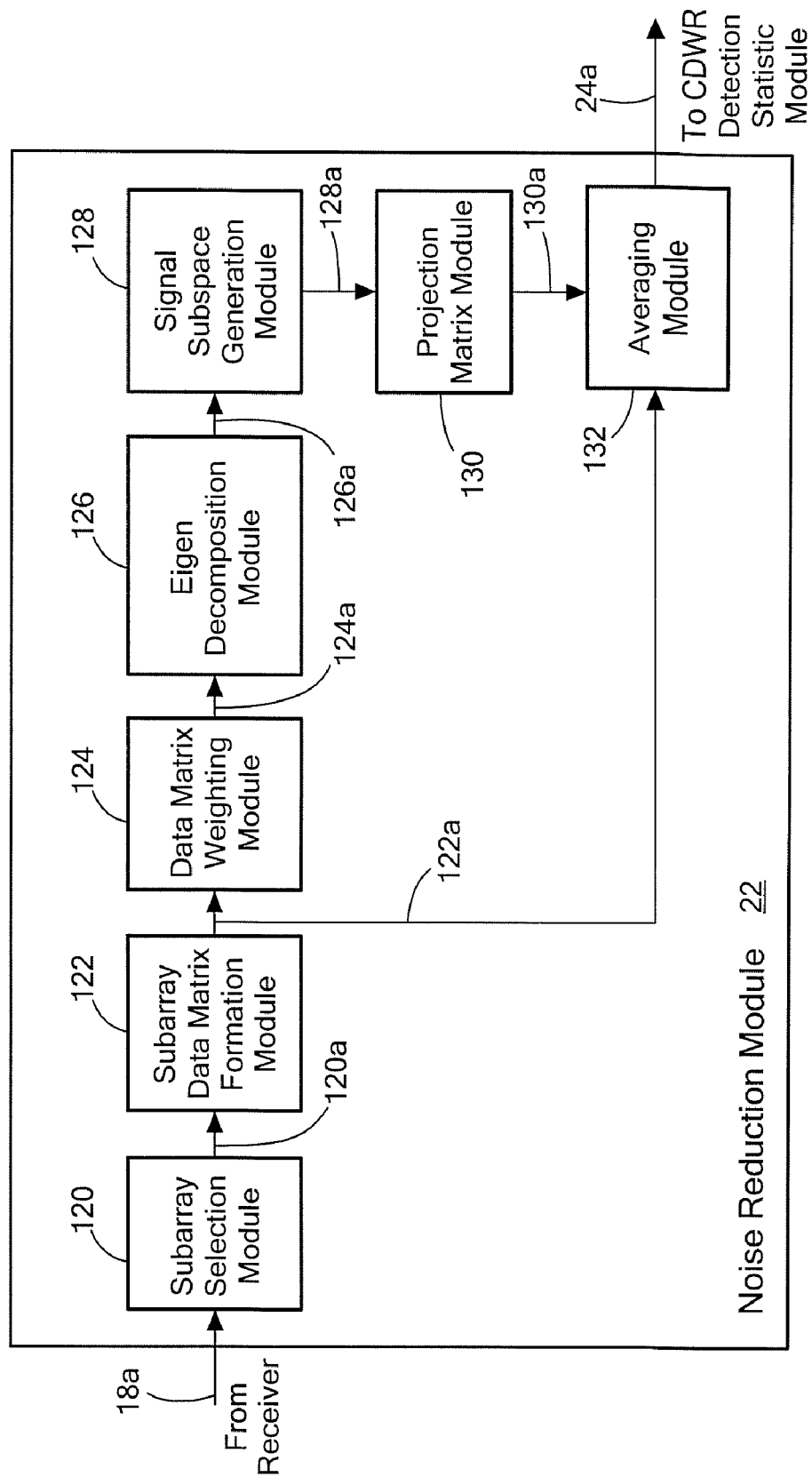
FIG. 4 is a block diagram showing further details of the noise reduction processor of FIG. 1.

Referring now to FIG. 4, in which like elements of FIG. 1 are shown having like reference designations, the noise reduction processor 22 of FIG. 1 is coupled to receive the plurality of receive signals 18a.

The noise reduction processor 22 can include a subarray selection module 120 coupled to receive the plurality of receive signals 18a and configured to select a subarray associated with either all of the plurality of receive signals 18a or with a subset of the plurality of receive signals 18a (but still a plurality of receive signals 18a, i.e., two or more). The subarray selection module is configured to generate a selected plurality of receive signals 120a associated with the selected subarray.

The noise reduction module 22 can also include a subarray data matrix formation module 122 coupled to receive the selected plurality of receive signals 120a and configured to assemble the selected plurality of receive signals 120a into a time bounded set of data samples (i.e., time samples), which can be arranged in a data (i.e., time sample) matrix 122a. In examples described below in conjunction with FIG. 5, the array of time samples is associated with the subarray 50a of FIG. 2, e.g., five sets of time samples, each set ten samples long. However, as described above, a subarray can have any number of array elements greater than one. Furthermore, the number of time samples used for each element of the subarray (or each beam) can be greater than or less than ten time samples.

The time sample matrix 122a is received by a data matrix weighting module 124. Operation of the data matrix weighting module is described more fully below in conjunction with FIG. 4. However, let it suffice here to say that the sets of time samples, e.g., five sets of time samples corresponding to the five element subarray 50a of FIG. 2, can be proportionately weighted according to their importance, i.e., the amount by which they correlate with the time samples associated with the selected reference element (i,j) of FIG. 2. The data weighting matrix module 124 can provide a weighted data matrix 124a to an eigen decomposition module 126.

Operation the eigen decomposition module is also described more fully below in conjunction with FIG. 5. Let it suffice here to say that the eigen decomposition module is configured to perform an eigen decomposition of the weighted data matrix 124a into a combination of eigen vectors and associated eigen values equivalent to the weighted data matrix 124a.

The eigen decomposition module 126 can provide the eigen decomposition 126a (i.e., eigen vectors and associate eigen values) to a signal subspace generate module 128. Operation of the signal subspace generate module is also described more fully below in conjunction with FIG. 5. Let it suffice here to say that the signal subspace generation module 128 is configured to identify eigen vectors having eigen values above a threshold determined by the signal subspace generation module 128. The identified eigen vectors and eigen values form a so-called "signal subspace." The signal subspace 128a can be provided to a projection matrix module 130. The projection matrix module 130 can also be coupled to receive the time sample matrix 122a.

Operation of the projection matrix module 130 is also described more fully below in conjunction with FIG. 5. Let it suffice here to say here that the projection processing module 130 can compose the signal subspace into a projection matrix 130a.

The noise reduction module 22 can also include an averaging module coupled to receive the projection matrix 130a and also to receive the time sample matrix 122a. Operation of the averaging module is also described more fully below in conjunction with FIG. 5. However, let it suffice here o say that the averaging module 132 can be configured to average products of the projection matrix 130a and the time sample matrix 122a to generate the noise reduced signal 24a (FIG. 1) associated with the reference one of the plurality of receive signals 18a (FIG. 1) associated with the reference element, e.g., (i,j) of FIG. 2, of the subarray, e.g., 50a of FIG. 2.

Figure 5:
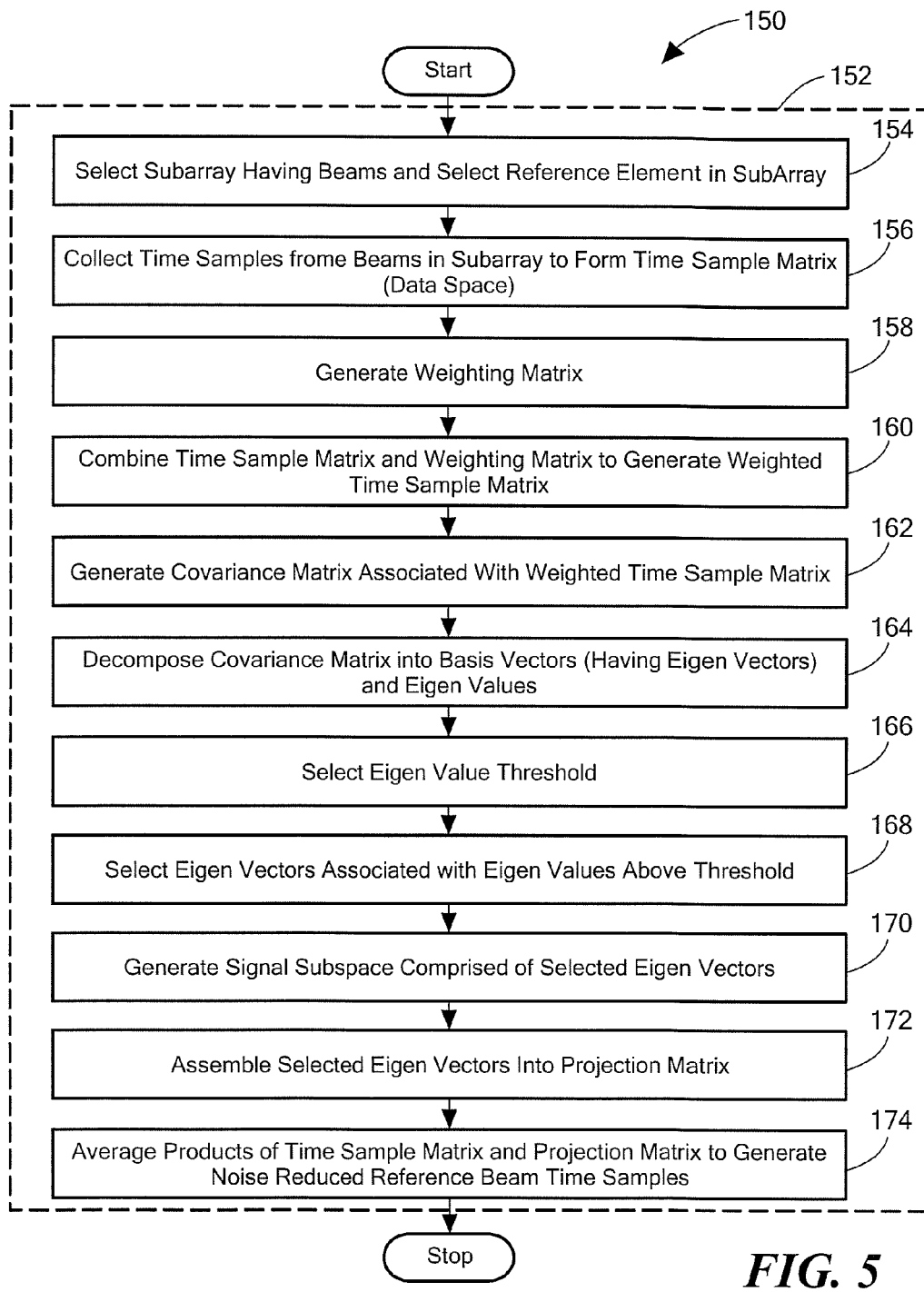
FIG. 5 is a flow chart showing a processing method that can be performed by the noise reduction processor of FIGS. 1 and 4.
Figure 6:
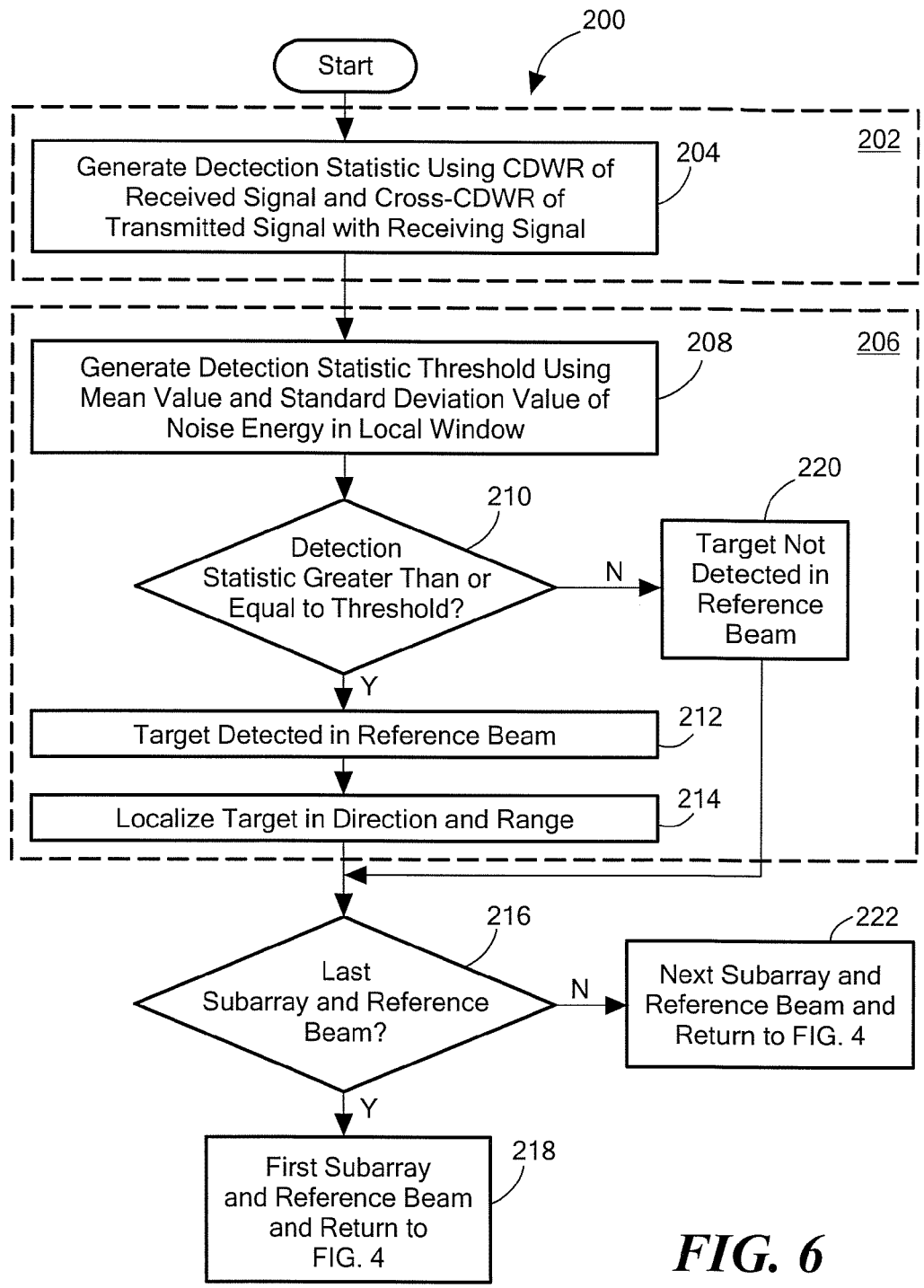
FIG. 6 is a flow chart showing a processing method that can be performed by the CDWR detection statistic module and the detection and localization module of FIG. 1.

It should be appreciated that FIGS. 5 and 6 show flowcharts corresponding to the below contemplated technique which would be implemented in computer system 10 (FIG. 1). Rectangular elements (typified by element 154 in FIG. 5), herein denoted "processing blocks," represent computer software instructions or groups of instructions. Diamond shaped elements (typified by element 216 in FIG. 6), herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Referring now to FIG. 5, a process 150 can be representative of processing that can be performed by the noise reduction module 22 of FIGS. 1 and 4. The process begins at step 154, where a subarray, for example the subarray 50a of FIG. 2, is selected and a reference element (or beam) from within the subarray is also selected.

Examples used below use a subarray having five elements (or beams), such as the subarray 50a of FIG. 2. However, in other embodiments, a subarray can have any number of elements greater than one element. Furthermore, the example below uses ten time samples for each of the five elements of the subarray. However, as discussed above, any number of time samples can be used.

Still further, the process 150 is described to process one subarray. However, as discussed below, each subarray of a larger array can be processed in the same way. It will become apparent from discussion in conjunction with FIG. 6 that the process 150 can be repeated for other subarrays, for example, within the array 50 of FIG. 2.

As a subarray, it may be advantageous to select a reference element and four elements adjacent to the reference element (or, equivalently, a reference beam and four beams adjacent to the reference beam) because an underwater target, e.g., an underwater mine, is most likely seen in more than one of the five beams. Also, the reference beam would tend to have similar statistics corresponding to a target as compared to at least one of the four adjacent beams if the target is seen within the reference (i.e., center) beam.

At block 156, time samples from the beams in the selected subarray from block 154 are collected and assembled into a data (i.e., time sample) matrix, also referred to herein as a "data space."

Time samples of the subarray, i.e., the data space, can be represented as:

$$X = \{x_{i,j}, x_{i-1,j}, x_{i+1,j}, x_{i,j-1}, x_{i,j+1}\}, \quad (1)$$

where each small "x" is a set of time samples, for example, ten time samples, from an array element (or beam) identified by the "i,j" subscripts as in FIG. 2.

Note that the first entry corresponds to the selected reference beam, (i,j), of FIG. 2. It should be appreciated that each small x can correspond to a 1×10 vector, and X can correspond to a 5×10 matrix, in which each row corresponds to a beam and each column corresponds to a time. This nomenclature will be presumed for continuations of this example below.

However, equivalently, each small x can correspond to a 10×1 vector, and X can correspond to a 10×5 matrix, in which each column corresponds to a beam and each row corresponds to a time.

The time samples, X, in matrix form, can correspond to the time sample matrix 122a of FIG. 4.

At block 158 a so-called "weighting matrix" can be formed in the following way: The symbol, W, is a diagonal weight matrix determined by the correlations between the center beam and the adjacent beams. The weighting matrix $$W = \begin{bmatrix} \alpha & & & & \\ & w_1 & & & \\ & & w_2 & & \\ & & & w_3 & \\ & & & & w_4 \end{bmatrix}$$

can be calculated by the following equations:

$$\alpha \in (0.4, 0.5) \quad (2)$$

$$\beta = 1.0 - \alpha \quad (3)$$

$$q_k = cor(x_0, x_k), k = 1, 2, 3, 4. \quad (4)$$

$$w_k = \frac{q_k}{\sum_{i=1}^{4} q_i} \beta, k = 1, 2, 3, 4. \quad (5)$$

The value α corresponds to a weight to be applied to the reference beam. In some embodiments, the weight α is selected to be between 0.4 and 0.5. However, other weights less than 0.4 and grater than 0.5 can also be used. Note that the weighting coefficients $W_k$ are associated with an amount by which time samples from each corresponding element (or beam) in the selected subarray correlate with time samples from the reference element (or beam).

At block 160, the time sample matrix, X, from block 156 is combined with the weighting matrix, W, from block 158 to generate a weighted time sample matrix, Y, in the following way:

$$Y = \begin{bmatrix} \alpha * x_1 \\ w_1 * x_2 \\ w_2 * x_3 \\ w_3 * x_4 \\ w_4 * x_5 \end{bmatrix} = WX^H \quad (6)$$

Where $x_1 = x_{i,j}^H$, $x_2 = x_{i-1,j}^H$, $x_3 = x_{i+1,j}^H$, $x_4 = x_{i,j-1}^H$ and $x_5 = x_{i,j+1}^H$, and the superscript H corresponds to a complex transpose.

The weighted time sample matrix can correspond to the weighted data matrix 124a of FIG. 4.

At block 162, a covariance matrix is generated having the form:

$$C = E[YY^H] = [c_{ij}] \quad (7)$$

$$\text{where } c_{ij} = \frac{1}{N} \sum_{i,j} y_i y_j^H \quad (8)$$

and N is the number of time samples in each beam data, for example, ten.

At block 164, the covariance matrix is decomposed using eigen analysis in the following way:

Theoretically, the covariance matrix can be represented by its spectral representation in terms of eigen value and eigen vectors. Namely $$C = \sum_k \lambda_k v_k v_k^H \quad (9)$$

Here, $\lambda_k$ and $v_k$ are the eigen value and eigenvector of the covariance matrix, respectively. To compute the eigen values and eigenvectors of the covariance matrix, we apply a so-called singular value decomposition (SVD) to the matrix. This results in:

$$C = U \Lambda V^H = \sum_k \sigma_k u_k v_k^H \quad (10)$$

where $U=\{u_1, \ldots, h_k\}$ and $V=\{v_1, \ldots, v_k\}$ are orthogonal matrices and $\Lambda$ is a diagonal matrix with $\sigma_k$ on the diagonal. Since the covariance is a symmetric nonnegative definite matrix, $\sigma_k = \lambda_k$ and $v_k$ is a corresponding eigenvector. The SVD is an efficient computational tool to obtain the spectral representation described in Equation 9. With the spectral representation, we can determine the principle components of the weighted data space, Y.

The decomposed matrix, C, can correspond to the eigen decomposition 126a of FIG. 4.

At block 166, an eigen value threshold, 11, is selected, namely, a predetermined threshold that can be used to select only those eigen vectors, $v_k$, for which the corresponding eigen value, $\lambda_k$, is sufficiently large. In some embodiments, the threshold is approximately 0.8. However, in other embodiments, the threshold is selected to have a value that will result in a selection of a few (e.g., three) of the eigen vectors. In still other embodiments, the threshold is selected to result in selection of some percentage of the eigen vectors, for example, fifty percent of the eigen vectors.

At block 168, the predetermined threshold is applied to the eigen values to select associated eigen vectors in the following way:

If target signal energy is larger than noise energy, the principle components of the data space correspond to the signal subspace. To determine the principle components, we apply a thresholding technique to the eigen values. Specifically, for a given threshold η, the eigenvectors of the principle components are given as follows:

$$V_p = \left\{ v_k \in V : \frac{\sigma_k}{\sigma_{max}} \geq \eta \right\}, \quad (11)$$

where the symbol, ϵ, corresponds to "belongs to," and where $$\frac{\sigma_k}{\sigma_{max}}$$

is a ratio of a $k^{th}$ eigen value to a maximum eigen value. Thus, Vp includes only those eigen vectors having eigen values that are relatively large.

At block 170, the eigen vectors identified at block 168 are compiled into the signal subspace. It should be apparent that the vectors, Vp, can correspond to all of or a subset of all of the above eigen vectors, and therefore, the vectors, Vp, can be referred to herein as a "signal subspace." The signal subspace, Vp, can correspond to the signal subspace 128a of FIG. 4.

At block 172, the vectors, Vp, are arranged into a matrix to form a so-called "projection matrix."

The projection matrix, T, is constructed by the eigenvectors from $V_p$ that is given by $$T = [v_1, \ldots, v_s] \quad (12)$$

where the subscript s is the number of dimension of the signal subspace. Since the noise is orthogonal to the signal subspace, to project the sub beam array onto the signal subspace can reduce the noise in the sub array.

The projection matrix, T, can correspond to the projection matrix 128a of FIG. 4.

At block 174, the projection matrix, T, can be combined with the original time sample matrix, X, (i.e., data space) of equation 1 in the following way to generate the noise reduced signal 24a of FIGS. 1 and 4.

In one embodiment, the noise reduced data from the center beam, $\hat{x}_{i,j}$, can be computed by a weighted-average of the projection over the subarray. A noise reduced signal, U, can be computed as:

$$U = \begin{bmatrix} u_1 \\ u_2 \\ \vdots \\ u_s \end{bmatrix} = T^H X^H \quad (13)$$

$$\hat{x}_{i,j}^H = \hat{x}_1 = \sum_{i=1}^{s} q_i * u_i, \quad (14)$$

$$\text{where } q_i = \frac{\lambda_i}{\sum_{k=1}^{s} \lambda_k}$$

and where the $\lambda_k$, k=1, 2, ..., s, are the eigen values of the eigenvectors in equation 12, and where X is the subarray data given in equation 1.

It should be recognized that if the target is only seen in the reference element (or beam), the dimension of the signal subspace is one. In this case, the weighted-average of equation 14 has little significance since the projection becomes a one-dimensional signal. However, if the target is seen by more than one beam, the weighted-average operation results in a noise reduced signal associated with the reference beam, i.e., the noise reduced signal 24a of FIGS. 1 and 4.

Before describing functions of the CDWR detection statistic module 26 and detection and localization module 28 of FIG. 1, the CDWR function is first generally discussed below.

In time-frequency analysis, the Wigner Distribution (WD) is a useful analysis tool. The Wigner Distribution provides a signal representation in the time-frequency domain. For given signals s(t) and g(t) a cross-WD is defined as $$WD_{s,g}(t, f) = \int_{-\infty}^{+\infty} s\left(t + \frac{\tau}{2}\right) g^*\left(t - \frac{\tau}{2}\right) e^{-j2\pi f \tau} d\tau \quad (15)$$

Equation 15 is called an auto-WD when s(t)=g(t).

The WD suffers from a problem of cross-term interference, which results in extra spectral content located between the two sets of signal spectrum in the time-frequency domain. This problem prevents the WD from being widely used in many applications. In order to overcome the problem, many techniques for reducing the undesirable cross-term interference have been identified. In particular, if the signals are Gaussian-shaped signals, the auto-terms and the cross-terms of the WD can be grouped into two terms separately; then the cross-terms can be easily removed from the WD.

According to Gabor expansion theory, an arbitrary shape signal s(t) can be represented by a set of basis functions as:

$$s(t) = \sum_{m,n} C_{m,n} h_{m,n}(t) \tag{16}$$

where: $h_{m,n}(t) = h(t-Tm)e^{j2\pi n\Omega t}$ (17)

The function h(t) is a synthesis function with unit energy; the $C_{m,n}$ are complex coefficients; and the m and n are integers. The parameters T and Ω are the constant time and frequency sample intervals, respectively. If we use a Gaussian-shaped function as the synthesis function h(t), the basis functions $h_{m,n}(t)$ are all Gaussian-shaped functions because $h_{m,n}(t)$ are time-shift and frequency-modulated Gaussian-shaped functions. As a result, the arbitrary function s(t) is just a linear combination of Gaussian-shaped functions obtained from the Gabor expansion. If we take the WD of the Gabor expansion of the function s(t), we have the WD of s(t) given as:

$$WD_s(t, f) = 2\sum_{m,n} |C_{m,n}|^2 e^{-[(t-m)^2/\sigma^2 + (2\pi\sigma)^2(f-n)^2]} + \tag{18}$$
$$4 \sum_{k \neq m, l \neq n} |C_{m,n} C_{k,l}^*| \times e^{-[(t-(m+k)/2)^2/\sigma^2 + (2\pi\sigma)^2(f-(n+l)/2)^2]} \times$$
$$\cos\left[2\pi\left((n-l)\left(t - \frac{m+k}{2}\right) + (m-k)\left(f - \frac{n+l}{2}\right)\right)\right].$$

The first term of equation 18 represents the auto-terms of the WD and the second term in equation 18 represents the cross-terms of the WD. Removal of the cross-term terms result in a cross-term deleted Wigner representation (CDWR) given as:

$$CDWR_s(t, f) = 2\sum_{m,n} |C_{m,n}|^2 e^{-[(t-m)^2/\sigma^2 + (2\pi\sigma)^2(f-n)^2]} \tag{19}$$

The CDWR has no cross-terms and correspond to the signal's contributions. Without the cross-terms, the CDWR is a powerful analysis tool for time-frequency analysis of a time variant signal.

The CDWR can be optimized in ways described below. To compute the CDWR of a signal, one needs to represent the signal by a linear combination of Gaussian-shaped basis functions via the Gabor expansion as given in equation 16. In the Gabor expansion, the Gaussian-shaped basis functions can generated by a Gaussian-shaped synthesis function, which can be given by:

$$h(t) = (\pi\sigma^2)^{-0.25} e^{-t^2/2\sigma^2} \tag{20}$$

where $\sigma^2$ is a signal variance.

In equation 20, the variance, $\sigma^2$, controls the resolutions in both the time and the frequency domains. A smaller value of $\sigma^2$ yields a better resolution in the time domain but a poorer resolution in the frequency domain, and vice-versa. It is desirable to optimize the CDWR to achieve the best resolutions in both the time domain and the frequency domain. Since the synthesis function only has one parameter, $\sigma^2$, optimizing the synthesis function corresponds to finding an optimal value of the variance, $\sigma^2$. In order to find the optimal value of $\sigma^2$, an objective for the optimization is determined. In one arrangement, a function of the quadratic time-frequency moment can be used to measure the energy concentration of the WD. The function is given as:

$$\Sigma_{WD} = \int\int [(t-t_s)^2 + (f-f_s)^2] WD(t, f) dt df \tag{21}$$
$$= \frac{1}{2}\left[\sigma^2 + \frac{1}{(2\pi\sigma)^2}\right]$$

where:

$$t_s = \int t|s(t)|^2 dt$$
$$f_s = \int f|S(f)|^2 df \tag{22}$$

The functions s(t) and S(f) are a Fourier transformation pair. Since a minimal energy concentration means a highest resolution in both the time and the frequency domains, the energy concentration measure can be used as the objective. Then, the goal is to find a value of $\sigma^2$ that minimizes the energy concentration measure defined in equation 21. To determine the optimal value, a derivative of the energy concentration with respect to the variance, $\sigma^2$, can be taken:

$$\frac{\partial \Sigma_{WD}}{\partial \sigma^2} = \frac{1}{2}\left[1 - \frac{1}{4\pi^2}(\sigma^2)^{-2}\right]. \tag{23}$$

Setting equation 23 to zero and solving for $\sigma^2$ results in an optimal value for $\sigma^2$:

$$\sigma_{opt}^2 = \frac{1}{2\pi} \tag{24}$$

It will be appreciated that the optimal value of $\sigma^2$ is independent of the applied signal s(t).

Referring now to FIG. 6, the noise reduced signal generated by the process 150 of FIG. 5 can be used to detect a target. A process 200 begins at block 204, where a detection statistic, η, is generated. The detection statistic can be generated in the following way:

$$\eta_{cdwr} = \int_{-\infty}^{+\infty}\int_{-\infty}^{+\infty} CDWR_{r,s}(t, f) CDWR_s(t, f) dt df, \tag{25}$$

where:
the function $CDWR_s(t, f)$ is given in equation 19;
the function r(t) is a received signal,
the function s(t) is a transmitted signal; and
the complex coefficients $C_{r_{m,n}}$ and $C_{s_{m,n}}$ are the Gabor expansion coefficients of r(t) and s(t), respectively.

It should be recognized that equation 25 corresponds to a product of two CDWRs, a cross-CDWR of the noise reduced signal (24a of FIGS. 1 and 4) with the transmitted signal (12a of FIG. 1) and an auto-CDWR of the transmitted signal (12a of FIG. 1) with itself, and a correlation thereof.

A discrete form of equation 25 is given below. A time window with a size of 2d can be used to compute the detection statistic, which makes the detection statistic time (i.e., range) dependent. The value d used below is a factor associated with a number of time steps (2d time steps). In some embodiments, fifty time steps can be used, and thus, 2d=50. However, in other embodiments, the number of time steps can be more than fifty or less then fifty. A time (i.e., range) dependent detection statistic can be calculated as follows:

$$\eta_{cdwr}(k) = \sum_{n=0}^{N} \sum_{m=k-d}^{k+d} CDWR_{r,s}(m\Delta t, n\Delta f) CDWR_s(m\Delta t, n\Delta f) \Delta t \Delta f \quad (26)$$

where the indices k and m are discrete time variables and the index n is a discrete frequency variable. It will, therefore, be recognized that the discrete detection statistic, $\eta(k)$, is comprised of a plurality of detection statistic values over time. In some embodiments, there are at least one thousand detection statistic values, equivalent to at least one thousand range increments.

The variables $\Delta t$ and $\Delta f$ are the step sizes in both the time domain and the frequency domain respectively. The summation in the frequency domain is over all frequencies; that is $N\Delta f=2\pi$. The summation in the time domain is only over the time window having the size 2d.

At block 208 a detection statistic threshold is generated in the following way. First, a local window is identified within the plurality of detection statistic values in order to compute noise energy. In some embodiments, between fifty and one hundred detection statistic values are used to compute the noise energy, however, other quantities of detection statistic values can also be used. Then, the noise energy is used to generate the detection statistic threshold, Th, as a combination of a mean value $m_n$ and a standard deviation $\sigma_n$ of the noise energy:

$$Th = m_n + \alpha \sigma_n \quad (27)$$

where: $\alpha$ is a constant that, in some embodiments, can have a value between 1.5 to 3.0.

At block 210, the detection statistic from equation 26 is compared with the detection statistic threshold from equation 27 in the following way:

For a given received signal r(t), a target detection is identified by the following hypothesis test:

Hypothesis $H_0$: r(t)=n(t), which represents no target detection

Hypothesis $H_1$: r(t)=s(t)+n(t), which represents a target detection where the function n(t) is white Gaussian noise.

$$\begin{cases} \text{If } \eta_{cdwr} >= m_n + \alpha \sigma_n, & H_1 \text{ is true} \\ \text{If } \eta_{cdwr} < m_n + \alpha \sigma_n, & H_0 \text{ is true} \end{cases} \quad (28)$$

where, as described above, the constant $\alpha$ can have a value between 1.5 and 3.0.

If at block 210 a target is detected under hypothesis H1, then the process 150 continues to block 212.

At block 212, the target is thus detected in the reference beam under the H1 hypothesis.

At block 214, a direction and a range to the target can be computer. Azimuthal direction and elevation direction relative to the receive array can be computed merely by recognizing the pointing direction of the reference beam in which the target as detected. Distance to the target can be identified by the above-computed CDWR function, wherein a time delay to the target can be identified by the signal detected within the CDWR.

It should be recognized that the block within a boundary 202 can be performed by the CDWR detection statistic module 26 of FIG. 1 and the blocks within a boundary 206 can be performed by the detection and localization module 28 of FIG. 1.

The above-described processing blocks of FIGS. 5 and 6 produce a detection and localization associated with the reference beam, i.e., (i,j) of FIG. 2. Additional blocks of FIG. 6 move to other reference beams that can be selected within the array 50 of FIG. 2.

At block 216, it is determined whether the subarray and associated reference beam thus far processed are the last subarray and associated reference beam to be processed. If the subarray and associated reference beam thus far processed are the last subarray and associated reference beam to be processed, then process 150 continues to block 218, where the first subarray and associated reference beam are again selected and the process returns to block 152 of FIG. 5.

If, at block 210, the detection statistic is not greater than the detection statistic threshold, then at block 220, a target is not detected and the process continues at block 216.

If at block 216, the subarray and associated reference beam thus far processed are not the last subarray and associated reference beam to be processed, then the process 200 continues to block 222, where the next subarray and associated reference beam are selected and the process returns to block 156 of FIG. 5.

Having described preferred embodiments of the invention it will now become apparent to those of ordinary skill in the art that other embodiments incorporating these concepts may be used. Additionally, the software included as part of the invention may be embodied in a computer program product that includes a computer readable storage medium. For example, such a computer readable storage medium can include a readable memory device, such as a hard drive device, a CD-ROM, a DVD-ROM, or a computer diskette, having computer readable program code segments stored thereon. A computer readable transmission medium can include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:
1. A sonar system, comprising:
a noise reduction module coupled to receive a plurality of receive signals, the plurality of receive signals being electronic receive signals, wherein each one of the plurality of receive signals is spatially directive and each is representative of sound propagating in water from a different respective pointing direction, wherein the plurality of receive signals is associated with a plurality of acoustic receive elements disposed in the water, wherein the noise reduction module is configured to select one of the plurality of receive signals as a reference signal, wherein the reference signal comprises a combination of a noise signal portion and a target echo signal portion, wherein the noise reduction processor is further configured to combine the plurality of receive signals resulting in a reduction of the noise signal portion to generate a corresponding noise reduced signal associated with the reference signal.

2. The sonar system of claim 1, wherein the noise reduction module comprises:
- a subarray selection module configured to select the plurality of receive signals;
- a data weighting module coupled to receive the plurality of receive signals selected by the subarray selection module and configured to weight the plurality of receive signals with respective weighting factors to generate a weighted plurality of receive signals;
- an eigen decomposition module coupled to receive the weighted plurality of receive signals, configured to generate a covariance matrix from the weighted plurality of receive signals, configured to represent the covariance matrix as a sum of products of eigen values, eigen vectors, and transposes of eigen vectors;
- a signal subspace generation module configured to select from the eigen vectors those eigen vectors having eigen values greater than a predetermined threshold to generate a signal subspace;
- a projection matrix module configured to assemble the selected eigen vectors into a projection matrix; and
- an averaging module configured to combine the projection matrix and the plurality of receive signals to generate the noise reduced signal.

3. The sonar system of claim 2, wherein the predetermined threshold is selected in accordance with a ratio of an eigen value and a maximum eigen value.

4. The sonar system of claim 2, wherein the data weighting module is configured to generate correlations between the plurality of receive signals and to weight the plurality of receive signals in response to the correlations.

5. The sonar system of claim 2, wherein the averaging module is configured to multiply the projection matrix by the plurality of receive signals.

6. The sonar system of claim 1, further comprising:
- a cross-term deleted Wigner representation detection statistic module coupled to receive the noise reduced signal and configured to generate a plurality of detection statistic values by computing a cross-term deleted Wigner representation; and
- a detection and localization module coupled to receive the plurality of detection statistic values, configured to determine a detection threshold, configured to compare the plurality of detection statistic values to the detection threshold to determine a detection of a target, and configured to identify a direction of the target and a distance to the target.

7. The sonar system of claim 6, wherein the cross-term deleted Wigner representation detection statistic module is configured to compute a sum of products over time and over frequency of a cross-term deleted Wigner representation of the transmit signal with the noise reduced signal times a cross-term deleted Wigner representation of the transmit signal with itself.

8. The sonar system of claim 6, wherein the detection threshold is determined as a combination of a mean and a standard deviation of a noise in a selected time window within the plurality of detection statistic values.

9. The sonar system of claim 1, wherein the plurality of acoustic receive elements each have a respective directional beampattern, each beampattern pointing in a respective one of the plurality of different pointing directions.

10. The sonar system of claim 1, further comprising a beamformer to generate the plurality of receive signals as electronically beamformed signals pointing to the plurality of different pointing directions.

11. The sonar system of claim 1, wherein the plurality of acoustic receive elements is arranged as one of a planar array or a conformal array conforming to a surface.

12. The sonar system of claim 1, wherein the plurality of acoustic receive elements is arranged as a line array.

13. A method of sonar processing, comprising:
- receiving a plurality of receive signals, the plurality of receive signals being electronic receive signals, wherein each one of each of the plurality of receive signals is spatially directive, and each is representative of sound propagating in water from a different respective pointing direction, wherein the plurality of receive signals is associated with a plurality of acoustic receive elements disposed in the water;
- selecting a one of the plurality of receive signals as a reference signal, wherein the reference signal comprises a combination of a noise signal portion and a target echo signal portion; and
- combining the plurality of receive signals resulting in a reduction of the noise signal portion to generate a corresponding noise reduced signal associated with the reference signal.

14. The method of claim 13, wherein the combining the plurality of receive signals comprises:
- weighting the plurality of receive signals with respective weighting factors to generate a weighted plurality of receive signals;
- generating a covariance matrix from the weighted plurality of receive signals;
- representing the covariance matrix as a sum of products of eigen values, eigen vectors, and transposes of eigen vectors;
- selecting from the eigen vectors those eigen vectors having eigen values greater than a predetermined threshold to generate a signal subspace;
- assembling the selected eigen vectors to form a projection matrix; and
- combining the projection matrix and the plurality of receive signals to generate the noise reduced signal.

15. The method of claim 14, wherein the predetermined threshold is selected in accordance with a ratio of an eigen value and a maximum eigen value.

16. The method of claim 14, wherein the weighting comprises:
- generating correlations between the plurality of receive signals; and
- weighting the plurality of receive signals in response to the correlations.

17. The method of claim 14, wherein the combining comprises multiplying the projection matrix by the plurality of receive signals.

18. The method of claim 13, further comprising:
- generating a plurality of detection statistic values by computing a cross-term deleted Wigner representation associated with the noise reduced signal;
- determining a detection threshold;
- comparing the plurality of detection statistic values to the detection threshold to determine a detection of a target; and
- identifying a direction of the target and a distance to the target.

19. The method of claim 18, wherein the generating the plurality of detection statistic values comprises:

computing products over time and over frequency of a cross-term deleted Wigner representation of the transmit signal with the noise reduced signal times a cross-term deleted Wigner representation of the transmit signal with itself.

20. The method claim 18, wherein the detection threshold is determined as a combination of a mean and a standard deviation of a noise in a selected time window within the plurality of detection statistic values.

21. The method of claim 13, wherein the plurality of acoustic receive elements each have a respective directional beampattern, each beampattern pointing in a respective one of the plurality of different pointing directions.

22. The method of claim 13, wherein the electronic receiver comprises a beamformer to generate the plurality of receive signals as electronically beamformed signals pointing to the plurality of different pointing directions.

23. The method of claim 13, wherein the plurality of acoustic receive elements is arranged as one of a planar array or a conformal array conforming to a surface.

24. The method of claim 13, wherein the plurality of acoustic receive elements is arranged as a line array.

25. A non-transitory computer-readable storage medium having computer readable code thereon for providing sonar processing, the medium comprising:
instructions for receiving a plurality of receive signals, the plurality of receive signals being electronic receive signals, each one of the plurality of receive signals representative of sound propagating in water from a different respective pointing direction, wherein the plurality of receive signals is associated with a plurality of acoustic receive elements disposed in the water;
instructions for selecting one of the plurality of receive signals as a reference signal, wherein the reference signal comprises a combination of a noise signal portion and a target echo signal portion; and
instructions for combining the plurality of receive signals resulting in a reduction of the noise signal portion to generate a corresponding noise reduced signal associated with the reference signal.

26. The non-transitory computer-readable storage medium of claim 25, wherein the instructions for combining the plurality of receive signals comprise:
instructions for weighting the plurality of receive signals with respective weighting factors to generate a weighted plurality of receive signals;
instructions for generating a covariance matrix from the weighted plurality of receive signals;
instructions for representing the covariance matrix as a sum of products of eigen values, eigenvectors, and transposes of eigen vectors;
instructions for selecting from the eigen vectors those eigen vectors having eigen values greater than a predetermined threshold to generate a signal subspace;
instructions for assembling the selected eigen vectors to form a projection matrix; and
instructions for combining the projection matrix and the plurality of receive signals to generate the noise reduced signal.

27. The non-transitory computer-readable storage medium of claim 26, wherein the predetermined threshold is selected in accordance with a ratio of an eigen value and a maximum eigen value.

28. The non-transitory computer-readable storage medium of claim 26, wherein the instructions for weighting comprise:
instructions for generating correlations between the plurality of receive signals; and
instructions for weighting the plurality of receive signals in response to the correlations.

29. The non-transitory computer-readable storage medium of claim 26, wherein the instructions for generating the plurality of detection statistic values comprise:
instructions for computing products over time and over frequency of a cross-term deleted Wigner representation of the transmit signal with the noise reduced signal times a cross-term deleted Wigner representation of the transmit signal with itself.

30. The non-transitory computer-readable storage medium of claim 26, further comprising:
instructions for generating a plurality of detection statistic values by computing a cross-term deleted Wigner representation;
instructions for determining a detection threshold;
instructions for comparing the plurality of detection statistic values to the detection threshold to determine a detection of a target; and
instructions for identifying a direction of the target and a distance to the target.

31. The non-transitory computer-readable storage medium of claim 30, wherein the detection threshold is determined as a combination of a mean and a standard deviation of a noise in a selected time window within the plurality of detection statistic values.

32. The non-transitory computer-readable storage medium of claim 26, wherein the plurality of acoustic receive elements each have a respective directional beampattern, each beampattern pointing in a respective one of the plurality of different pointing directions.

33. The non-transitory computer-readable storage medium of claim 26, wherein the instructions for combining comprise instructions for multiplying the projection matrix by the plurality of receive signals.

34. The non-transitory computer-readable storage medium of claim 25, wherein the instructions for generating the plurality of receive signals comprises instructions for beamforming to generate a plurality of beamformed signals pointing to the plurality of different pointing directions.

35. The non-transitory computer-readable storage medium of claim 25, wherein the plurality of acoustic receive elements is arranged as one of a planar array or a conformal array conforming to a surface.

36. The non-transitory computer-readable storage medium of claim 25, wherein the plurality of acoustic receive elements is arranged as a line array.

* * * * *